Nov. 5, 1968 M. P. MARCUS ET AL 3,409,881
NONDESTRUCTIVE READ-OUT STORAGE DEVICE
WITH THRESHOLD LOGIC UNITS

Filed Aug. 8, 1966 4 Sheets-Sheet 1

INVENTORS
MITCHELL P. MARCUS
CYRIL J. TUNIS
BY Henry E. Otto Jr.
ATTORNEY

ASSUME n = 4; m = 10

| 2ⁿ ADDRESSES | | | | m - BIT WORDS | | | | | | | | | |
|---|---|---|---|---|---|---|---|---|---|---|---|---|---|
| A | B | C | D | 1 | 2 | 3 | 4 | 5 | 6 | 7 | 8 | 9 | 10 |
| 0 | 0 | 0 | 0 | 1 | 0 | 1 | 0 | 1 | 1 | 1 | 0 | 0 | 1 |
| 0 | 0 | 0 | 1 | 1 | 1 | 1 | 0 | 1 | 0 | 0 | 0 | 1 | 1 |
| 0 | 0 | 1 | 1 | 0 | 0 | 1 | 1 | 0 | 0 | 1 | 0 | 1 | 1 |
| 0 | 1 | 0 | 0 | 1 | 0 | 0 | 1 | 0 | 1 | 0 | 0 | 0 | 0 |
| ⋮ | | | ⋮ | ⋮ | ⋮ | ⋮ | | | | | | | ⋮ |
| 1 | 1 | 1 | 0 | 1 | 0 | 1 | 1 | 1 | 0 | 1 | 1 | 1 | 1 |
| 1 | 1 | 1 | 1 | 0 | 1 | 1 | 0 | 1 | 0 | 1 | 0 | 0 | 1 |

BOOLEAN EXPRESSIONS
FOR BIT 1: $\bar{A}\bar{B}\bar{C}\bar{D} + \bar{A}\bar{B}\bar{C}D + \bar{A}B\bar{C}\bar{D} + \ldots ABC\bar{D}$
FOR BIT 2: $\bar{A}\bar{B}\bar{C}D + \ldots ABCD$ Nov. 5, 1968 M. P. MARCUS ET AL 3,409,881

NONDESTRUCTIVE READ-OUT STORAGE DEVICE WITH THRESHOLD LOGIC UNITS

Filed Aug. 8, 1966 4 Sheets-Sheet 4

United States Patent Office 3,409,881

Patented Nov. 5, 1968

3,409,881

NONDESTRUCTIVE READ-OUT STORAGE DEVICE WITH THRESHOLD LOGIC UNITS

Mitchell P. Marcus, Binghamton, and Cyril J. Tunis, Endwell, N.Y., assignors to International Business Machines Corporation, Armonk, N.Y., a corporation of New York Filed Aug. 8, 1966, Ser. No. 570,928
6 Claims. (Cl. 340—172.5)

Figure 1A:
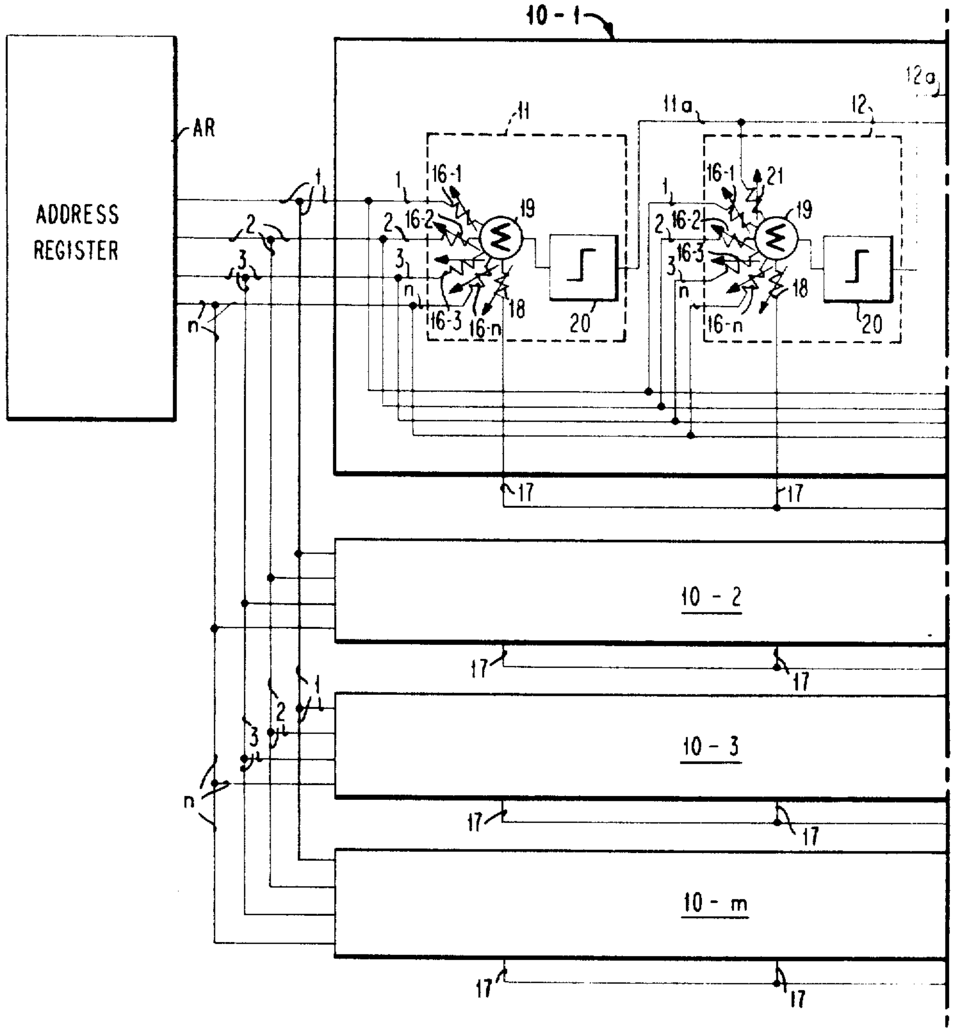

This invention relates to nondestructive readout storage devices which are organized according to the contents of corresponding bit positions of the respective words, rather than word-oriented; and the invention relates more particularly to storage devices of such type employing threshold logic units to reduce substantially the extent and complexity of decoding needed to access a selected word.

A conventional magnetic core storage unit containing, for example, $2^{15}$ or 32,768 words of 60 bits each would require a total of 1,966,080 bits; and in such case, accessing of the selected word would be accomplished from a 15-bit address register through a conventional relatively complex decode network. As the number of words increases, decoding becomes increasingly more complex and time consuming. There is a need for a nondestructive read-out storage unit wherein the 1,966,080 bits in the assumed example plus decode circuitry could be replaced by simpler circuitry and provide more rapid response times; e.g., by 5000 variable weight analog threshold units or about 40,000 actual bits of auxiliary core storage, the latter approach being especially attractive in view of recent advances made in the art of monolithic circuitry.

It is one object of this invention to provide nondestructive read-out storage devices which are considerably faster and more economical than devices heretofore proposed, when employed for large capacity storage.

Another object is to provide a storage device which provides threshold logic units to minimize circuitry and reduce costs, and wherein the weights of these respective units can be predetermined algorithmically or determined adaptively.

Still another object is to provide a nondestructive read-out storage device in which the stored indicia is changed by changing the weighting of threshold units electronically or mechanically.

According to these objects, the nondestructive read-out storage device employing the invention provides $2^n$ words each comprising *m* bits of binary indicia. M separate logic means (preferably threshold logic devices) are provided, one for each of the *m* bit positions. Each logic means implements a Boolean expression solely for its corresponding bit position and contains at least one Boolean term of *n* variables, where *n* represents a number of parallel inputs to the device from an address register. Each Boolean term corresponds to an input address having a logical "1" in that bit posiiton of the word corresponding to the input address, such that a logical "1" output signal will be provided whenever and only when there is a logical "1" in that particular bit position of the word corresponding to the selected input address.

The separate threshold logic device for each bit position of the *m*-bit word comprises a plurality of threshold logic units preferably connected together in cascade more efficiently to implement the appropriate Boolean expression. The term "threshold logic unit" as used herein, is defined as one having a plurality of individually weighted binary inputs and a single binary output. In each such unit, if the algebraic sum of the respective weighted inputs which are in their "1" state plus a predetermined tare or bias weight exceeds a preselected threshold value, then the unit will provide a logical "1" output.

Figures 1B, 2:
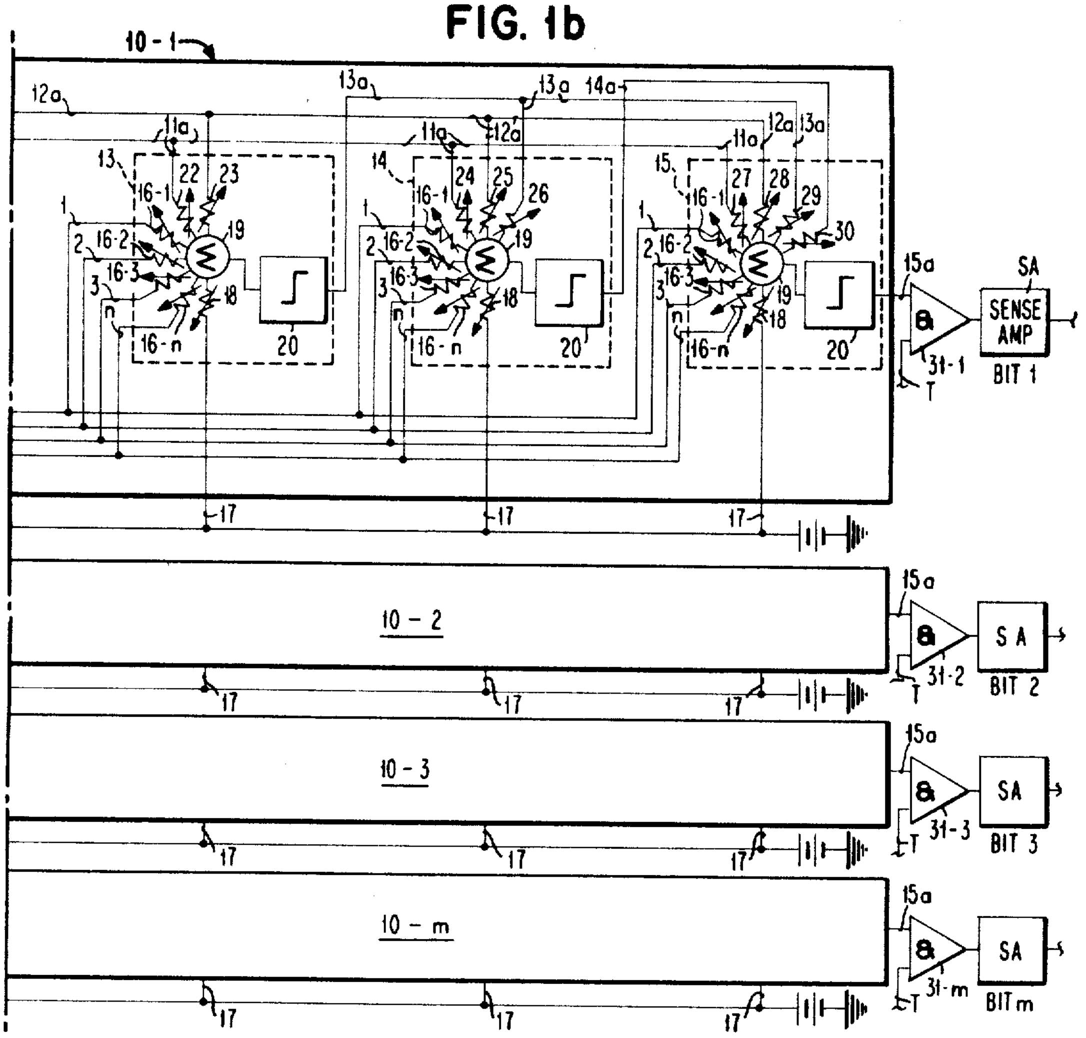
Figure 3A:
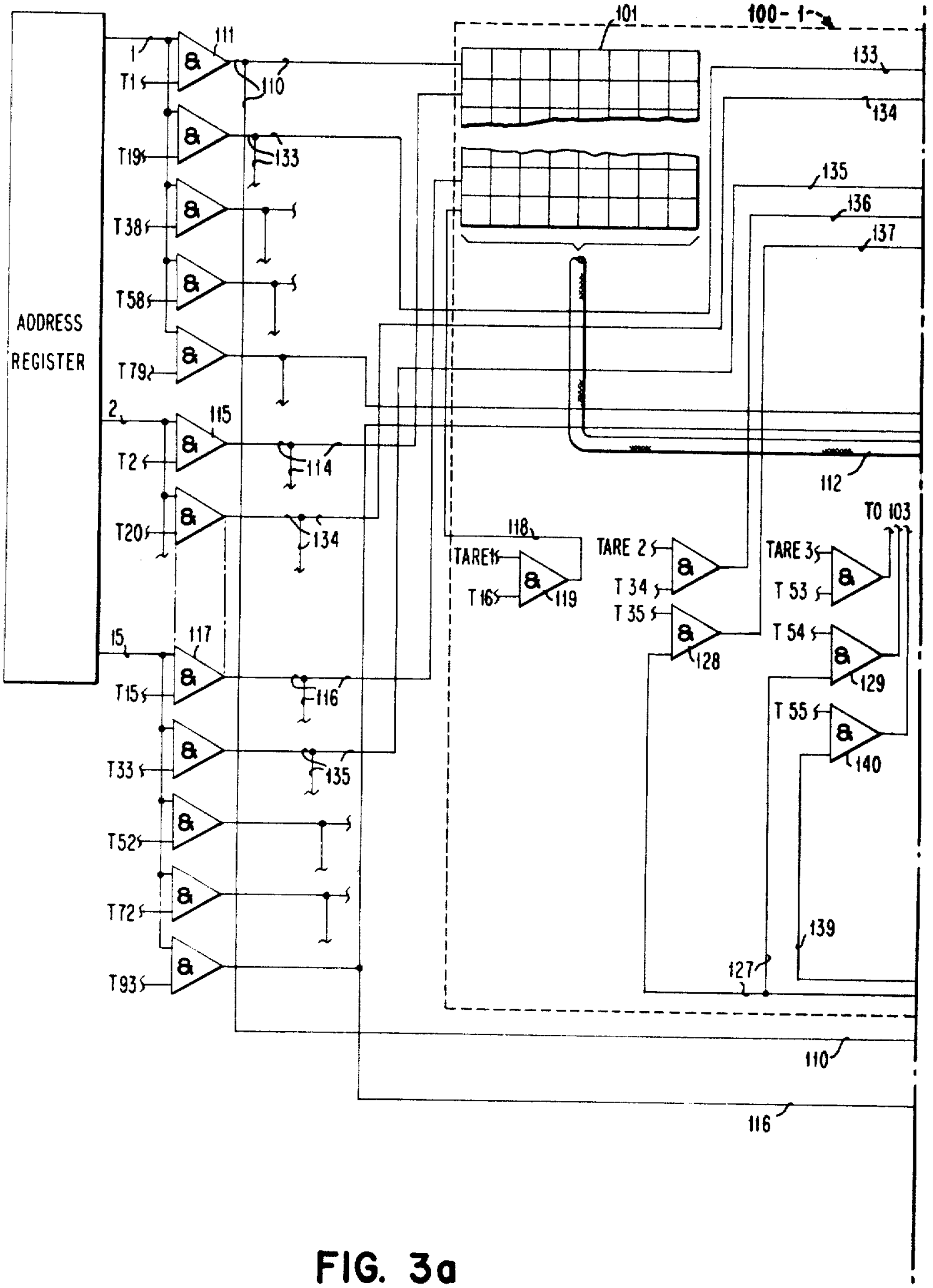
Figure 3B:
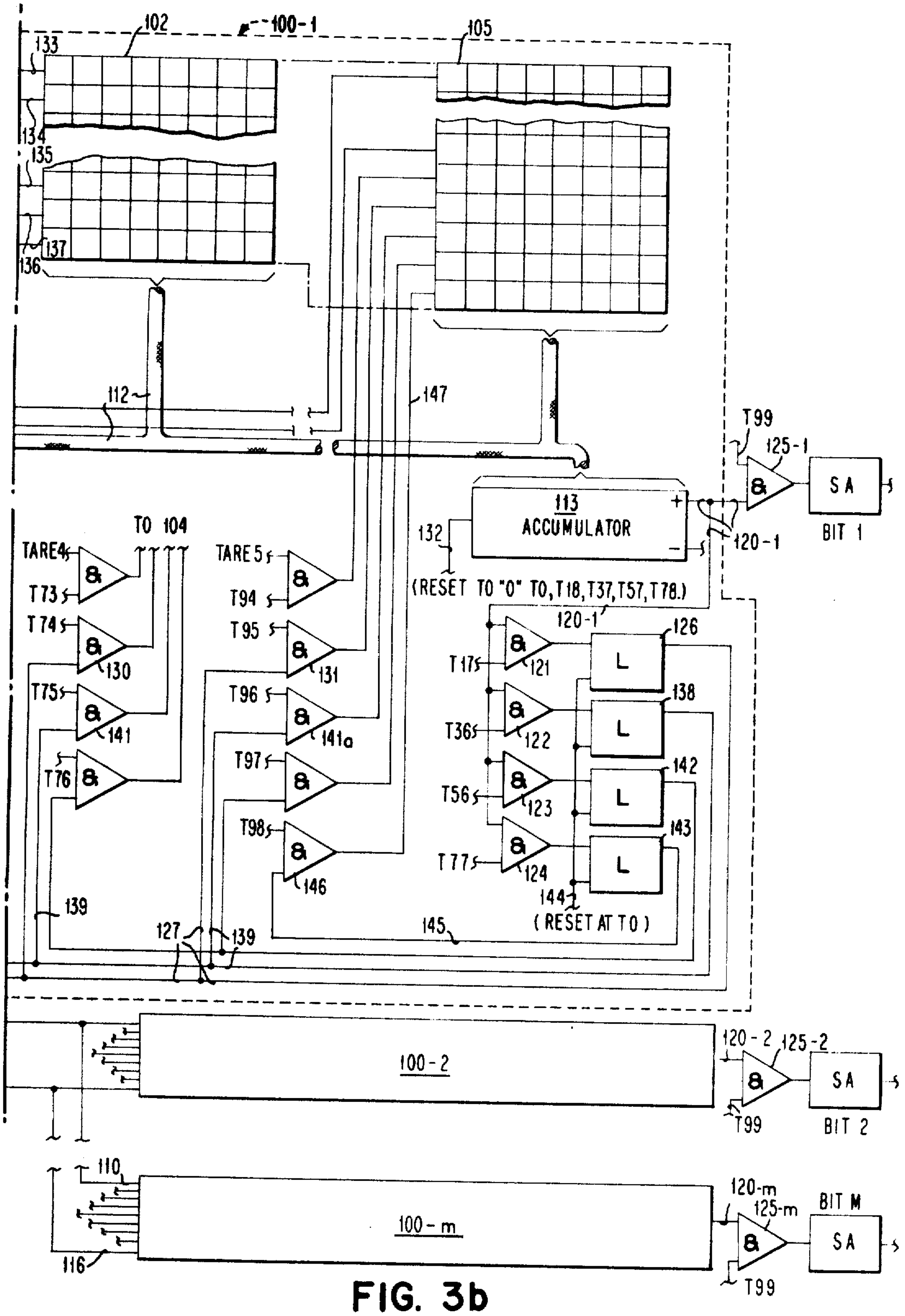

These and other objects and advantages will become apparent from the following more detailed description of the invention and from the accompanying drawings, wherein:

FIGS. 1*a* and 1*b*, when taken together such that the right hand edge of FIG. 1*a* is matched with the left hand edge of FIG. 1*b*, constitute a schematic view of a nondestructive read-out storage device according to an analog embodiment of the invention, employing separate analog-type threshold devices for each bit position of the multi-bit words to be stored therein;

FIG. 2 is a chart showing a plurality of illustrative words of *m* bits each which are to be read out for each one of a series of illustrative four-bit addresses constituting inputs to the bit-position-oriented storage devices embodying the invention;

FIGS. 3*a* and 3*b*, when taken together, such that the right hand edge of FIG. 3*a* is matched with the left hand edge of FIG. 3*b*, constitute a nondestructive read-out storage device according to a digital embodiment of the invention, and comprising separate auxiliary storage means and accumulators for each bit position of the *m*-bit words.

DESCRIPTION—FIG. 1

The analog version of nondestructive read-out storage device according to this embodiment comprises a plurality of threshold logic devices 10–1, 10–2, 10–3, . . . 10-*m*, one for each bit position of the *m*-bit word into which a selected *n*-bit address from an address register AR is to be decoded.

As illustrated, each threshold logic device 10 comprises a plurality of threshold logic units 11, 12, 13, 14, 15. Each of the *n* outputs from address register AR are connected in parallel by branches of respective wires 1, 2, 3 . . . *n* as separate inputs to each of the units 11 to 15. Within each of these respective units 11–15, these address-denoting inputs are variously weighted by preadjustment of adjustable resistors, such as 16–1, 16–2, 16–3, . . . 16–*n*; and a tare or bias input 17 is weighted a predetermined degree by preadjustment of an adjustable resistor 18. These weighted binary address inputs 1, 2, 3 . . . *n* and weighted tare input 17 within each unit are fed into a corresponding summation device 19. In each threshold logic unit, such as 11, if the algebraic sum of the weights of those binary inputs which are in their "1" state plus the tare weight exceeds the preselected threshold value, then a threshold detector 20 will be conditioned to provide a logical "1" output for that particular threshold logic unit. For example, assume that the preselected threshold value is zero; that the addresses have only four bits, and the selected address is "1110" for bits 1, 2, 3, *n*, respectively; that the weights of resistors 16–1, 16–2, 16–3, 16–*n* of unit 11 of device 10–1 are 4, −2, 8 and 6, respectively; and that the tare weight is −9. Then $$(1\times4)+(1\times-2)+(1\times8)+(0\times6)-9=1$$

which is more than the illustrative threshold value of zero; and hence unit 11 will be conditioned "on" and provide a logical "1" signal in its respective output line 11*a*.

The units 11 to 15 in each device 10 are connected in cascade such that the output 11*a* of each first unit 11 is connected in parallel as an additional input to each of the succeeding units 12, 13, 14, 15 respectively. Hence, branches of output line 12*a* from unit 12 are connected as an input to units 13, 14, 15; branches of output line 13*a* from unit 13 are connected as an output to units 14 and 15; and output line 14*a* from unit 14 is connected as an input to unit 15. Thus the final-stage unit 15 has four more inputs than the first stage unit 11. Within each of the respective units 12 to 15, these additional inputs are variously and individually weighted preselected degrees by ten adjustable resistors 21 to 30.

Assume now that a logical "1" output is provided in output line 15*a* from the final-stage unit 15 of threshold logic device 10–1. Under this condition, when a pulse is applied to line T at read-out time, a pulse will be supplied via AND gate 31–1 to a corresponding sense amplifier SA which senses and amplifies, in conventional manner, the binary coded "1" indicia in bit position 1 of the selected *m*-bit word.

It will be understood that the threshold logic devices 10–2, 10–3 . . . 10–*m* are similar to the device 10–1; and each of the *n*-bit outputs from the address register AR are connected in parallel by branches of the respective wires 1, 2, 3 . . . *n* as separate inputs to each of the units 11 to 15 (not shown) of each of the threshold logic devices 10–2, 10–3 . . . 10–*m*. Thus at read-out time T, a pulse will be supplied to the respective sense amplifier SA for bit positions 2, 3 . . . *m* via corresponding AND gates 31–2, 31–3 . . . 31–*m* if a logical "1" signal is present in the corresponding output line 15*a*.

The weights of the various resistors in the respective units 11 to 15 of each threshold logic device 10 may be determined adaptively in the manner explained in the co-pending application of Marcus, Rossman and Tunis, U.S. Ser. No. 421,063, filed Dec. 24, 1964 (Docket 6567) now Patent No. 3,358,271, assigned to the assignee of the present invention. Or, if preferred, the weights of the respective resistors may be predetermined algorithmically. In either event, the weights of the resistors are varied as necessary to implement a particular Boolean function that is predetermined in the manner now to be explained.

Assume for sake of simplified illustration that the *n*-bit address from register AR is expressed as a function of four variables A, B, C, D, thus providing a total of $2^4$, or 16 addresses. Assume also that these addresses are to be decoded into words of 10 binary bits each. In other words, assume *n* is equal to four and *m* is equal to ten. FIG. 2 is a table of these four-bit addresses and of the illustrative ten-bit words into which said addresses are to be decoded.

According to a feature of the invention, a separate Boolean expression is written for each bit position of the word; i.e., to denote at that specific bit position only those addresses when the corresponding word has a binary "1" in such bit position. For example, the only addresses of those enumerated for which the corresponding word has a binary "1" in bit position 1 are addresses 0000, 0001, 0100 . . . and 1110. Hence, the Boolean expression for bit position 1 is:

$$\overline{A}\overline{B}\overline{C}\overline{D}+\overline{A}\overline{B}\overline{C}D+\overline{A}B\overline{C}\overline{D}+\ldots ABC\overline{D}$$

Similarly, for bit position 2, the Boolean expression would be:

$$\overline{A}\overline{B}\overline{C}D+\ldots ABCD$$

And for bit position 10, the Boolean expression would be:

$$\overline{A}\overline{B}\overline{C}\overline{D}+\overline{A}\overline{B}\overline{C}D+\overline{A}BCD+\ldots ABC\overline{D}+ABCD$$

It will thus be apparent that for each bit position of any desired multi-bit word a separate and distinct Boolean expression can be written by the same technique as above explained, irrespective of the number of bits in the address input and irrespective of the number of bits in the words corresponding to such addresses. In fact, the greatest benefits in the way of operating speed and economy of manufacture are obtained when the number of addresses and number of bits per word are substantial. For example, a practical and economical embodiment would be the example above referred to wherein the address consists of 15 bits, thus providing $2^{15}$ or 32,768 different addresses and hence 32,768 different words of 60 bits each. Such a storage unit would involve 5400 variable resistors; i.e., 60 threshold logic devices each having 90 individually weighted resistors. The figure of ninety resistors includes the seventy-five resistors connected to the fifteen address inputs leading to each of the five threshold logic units per threshold logic device, the five tare resistors 18, and the ten resistors 21 through 30.

If and when the contents of the storage device are to be changed, new Boolean expressions must be written for each respective bit position, and the new expressions must be reimplemented adaptively or algorithmically, in the manner above explained.

DESCRIPTION—FIG. 3

In the digital version of nondestructive read-out storage device constructed according to this embodiment, the weighted values assigned to the address inputs, tare and the inputs constituting outputs from preceding units or stages in the same threshold device are stored in auxiliary storage units. These auxiliary storage units are substituted for the adjustable resistor-type units in the analog version so as to enable the weightings to be changed more rapidly.

As shown in FIG. 3, these auxiliary storage units are of conventional type employing a matrix arrangement of substantially square-hysteresis-loop ferrite cores into which indicia is written and from which indicia is read out by X and Y half-select coincident current techniques. More specifically, the digital threshold logical device 100–1 as illustrated for bit position 1 comprises five core storage units 101, 102 . . . 105 (103 and 104 not being shown to conserve space).

Assume that the proper weighted values for the address inputs, tare and the inputs constituting outputs from the previous devices 101–104 have been stored as 8-bit indicia in units 101–105. Assume further that address register AR provides a 15-bit address, although only the output from bits 1, 2 and 15 have been shown. Assume also that the address is "10 . . . 1" for the bits 1, 2 and 15, respectively. Assume now, for the sake of simplified explanation, that timing pulses T1 to T99 are applied successively to the storage unit for a serial read-out of the weighting indicia stored in the devices 101–105, as well as to initiate other functions hereinafter to be explained.

Under these assumed conditions, a logical "1" signal will be present in output line 1 from the first bit position of address register AR; and hence when line T1 is pulsed at T1 time, a drive pulse will be supplied to a word drive line 110 via an AND gate 111. The weighted value represented by the indicia stored along word line 110 will thereupon be sensed and read out in parallel from auxiliary core storage unit 101 and conveyed via respective lines in a cable 112 to an accumulator or counter 113.

Also, as above assumed, the output line 2 from the second bit position of address register AR contains a "0." Hence, no pulse will be supplied to word drive line 114 via AND gate 115 at T2 time. Consequently, the weighted value stored along line 114 in unit 101 will not be read out into accumulator 113.

As successive timing pulses T3 through T14 come up, the weighted values stored along the successive word lines in unit 101 will be read out into the accumulator in each case where a logical "1" had been present in the output lines (not shown) leading from the third through the fourteenth bit positions of the address register. When line T15 is pulsed at T15 time, since a "1" is then present in line 15, a drive pulse will be supplied to word drive line 116 via AND gate 117 for reading out into the accumulator the weighted value stored along said word line in unit 101.

A "1" signal will always be present in all tare lines designated Tare 1 to Tare 5. Hence, when line T16 is pulsed at T16 time, a drive pulse will be supplied to drive line 118 via AND gate 119 and cause the tare weight stored in unit 101 to be read out into accumulator 113.

The positive output terminal of accumulator 113 is connected to a line 120–1 having branches connected in parallel to AND gates 121 to 124 and 125–1. If, when line T17 is pulsed at T17 time, the accumulator total is positive and thus provides a signal in line 120–1, AND gate 121 will pass the pulse and set a latch 126 to provide a "1"

output signal in branches of line 127 leading to AND gates 128 to 131. Thus, a logical "1" output in line 120–1 after all weighted address inputs and tare weights have been algebraically summed is the equivalent of a logical "1" output from the summation device 19 in the embodiment of FIG. 1; and the output in line 127, which is cascaded and affcets each of the succeeding units 102 to 105, is the equivalent of the output in line 11*a* of the embodiment of FIG. 1.

At T18 time, the accumulator 113 is reset to zero in response to a reset pulse supplied to line 132. Then, starting at T19 time, the respective word drive lines of auxiliary core storage unit 102 are successively pulsed to read out into accumulator 113 the weighted values for each successive bit position of the selected address where a binary "1" is present in said address. Thus, a drive pulse will be supplied to line 133 at T19 time, but not to line 134 at T20 time. Line 135 will be pulsed at T33 time. The tare drive line 136 will be pulsed at T34 time since the Tare 2 line is always up. Then, at T35 time, if latch 126 had been set to provide a "1" in line 127, AND gate 128 will pass the pulse to a word drive line 137. Thus the various weighted address inputs, tare weight and output from unit 101 (if any) will be read out into the accumulator 113 in the manner which should be understood from the preceding description.

If the accumulator total is now positive, then AND gate 122 will pass the timing pulse at T36 time to set latch 138 for applying a "1" signal to line 139 so that AND gates 140, 141 and 141*a* will pass pulses at T55, T75 and T96 times, respectively. It should here be noted that the latches 126, 138, 142 and 143 once set, will remain set until they are reset at T0 time by a pulse supplied to reset line 144.

Meanwhile, at T37 time, a set pulse supplied to line 132 will reset accumulator 113 to zero. Then, the weighted address input values and tare weight and latched inputs (if any) from latches 126, 138, 142, 143 will be read out successively into accumulator 113, first from auxiliary storage unit 103 (not shown), then for unit 104 (not shown), and finally for unit 105, with the accumulator being reset in the interim at T57 time and at T78 time, after read out from unit 103 and then unit 104 are completed, respectively.

Assume that it is now T98 time. If latch 143 had been set at T77 time to bring up a "1" in line 145, AND gate 146 will pass the pulse at T98 time to word drive line 147; whereupon this last weighted input from unit 105 will be read out into accumulator 113 in the manner described. If the total in accumulator 113 is now positive and hence has provided a logical "1" signal in line 120–1, then the timing pulse applied to line T99 at T99 time will be passed through AND gate 125–1 to the sense amplifier SA for bit 1, for amplification in conventional manner. But if the total in accumulator 113 failed to exceed the preselected threshold value, then sense amplifier SA will not be activated at T99 time. Thus, if the selected address in the address register AR calls for a word having a "1" in its first bit position, then the threshold logic device 100–1 should operate to provide a logical "1" output signal in line 120–1 just prior to T99 time; whereas if the address calls for a word having a "0" in its first bit, then there should be no such output signal in line 120–1 just prior to T99 time.

At T0 time, which immediately follows T99 time, the accumulator 113 and also the latches 126, 138, 142 and 143 will be reset to zero by reset pulses supplied to lines 132 and 144. The device 100–1 will thereupon be conditioned to repeat, for a new selected address, the operations heretofore described.

Meanwhile, each of the digital threshold logic devices 100–2 through 100–*m*, for the bit positions 2 through *m*, respectively, of the *m*-bit word, will function in similar manner to pass a pulse via AND gates 125–2 through 125–*m* to the respective sense amplifier SA for the corresponding bits 2 through *m* at T99 time only if the corresponding output lines 120–2 through 120–*m* have logical "1" output signals therein. This, in turn, will depend upon whether the selected address was one that called for a "1" in the respective bits 2 through *m* of the *m*-bit word.

It should be noted that branches of the various drive lines (including 110, 133, 114, 134, 116, 135 and others unnumbered) lead to each of the threshold logic devices 100–2 through 100–*m*; and that there is one accumulator 113 for each such device 100–2 through 100–*m*. Hence, the weighted values stored in each of the auxiliary core storage units of the respective threshold logic units 100–1 through 100–*m* will be read out concurrently during the complete cycle of successive timing pulses from T0 through T99. Thus only one set of the AND gates shown vertically aligned at the left edge of FIG. 3*a* (and including 111, 115, 117) need be provided, irrespective of the number of bits in the *n*-bit address or the number of bits in the *m*-bit word. Thus, seventy-five such AND gates (like 111) would be required in the embodiment illustrated, wherein each threshold logic device 100 comprises five auxiliary core storage units 101 through 105 and the address register provides a fifteen-bit address.

It is again noted that a serial read-out arrangement is illustrated in FIG. 3 to facilitate an understanding of the invention and simplify the description. It will be understood by those skilled in the art that the cycle time of the storage device shown in FIG. 3 could be reduced considerably (from 100 timing pulses to about 22) by providing a separate accumulator for each of the five auxiliary units 101 through 105, so that the weighted values for each bit position of the address could be read out concurrently into the respective accumualtor for each such unit. This, of course, would then necessitate feeding the output of each accumulator into the accumulator for the succeeding stage or unit of the particular device 100. For example, the output of an accumulator associated exclusively with unit 101 would be equivalent to the output (if any) in line 120–1 at T17 time; and it is this output which will be transferred into the accumulators for units 102 through 105; and similarly the output of the accumulator for unit 102 will be transferred into the accumulators for units 103 to 105, etc., such that the outputs will be cascaded from unit to unit.

In any event, it will be understood that, if preferred, the auxiliary storage unit may be of some type other than the core storage type illustrated. For example, it may be of the card capacitor type, such as disclosed in the copending application of Grubb, Haskell, Lord and Rent, U.S. Ser. No. 449,500, filed Apr. 20, 1965 (Docket 6614) now Patent No. 3,355,722 assigned to the assignee of the present invention. By use of such a card capacitor type of unit, the stored weighting values determined adaptively or algorithmically for the various inputs and tare can be readily and rapidly changed merely by punching such values into a punchable memory document and then substituting it for the previous punched memory document.

It will now be seen that, according to features of the invention, each address in address register AR is decoded directly into respective word bit lines (rather than into word lines, such as is conventionally done). The decoding into word bit lines is achieved by using a separate logic device (preferably of the threshold type) for each of the bit positions of the word to implement a Boolean expression solely for that bit line or bit position. This expression is an OR type function wherein a logical "1" output signal is provided whenever and only when there is a logical "1" in that particular bit position of the word corresponding to the selected input address.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a nondestructive read-out storage device of the type providing $2^n$ words each comprising *m* bits of binary indicia, where *n* represents the number of parallel inputs to the device from an address register, the combination of:

*m* separate logic means, one for each of the *m* bit positions and each implementing a Boolean expression solely for that bit position and containing at least one Boolean term of *n* variables, each term corresponding to a respective input address wherein the corresponding word in such bit position contains a logical "1" so as to provide a predetermined output signal whenever and only when there is a logical "1" in that particular bit position of the word corresponding to the selected input address, and means for conveying the *n* address inputs in parallel directly to each of said logic means.

2. The combination according to claim 1, wherein:

each such logic means comprises a threshold unit that will provide said output signal if and only if the algebraic sum of the weights of those binary inputs which are in their logical "1" state plus a predetermined tare weight exceeds a preselected threshold value.

3. The combination according to claim 1, wherein each such logic means comprises:

at least one threshold logic unit, one of such units having a plurality of preselected weighted binary inputs, a tare of predetermined weight, and a single binary output which provides said output signal, and any additional threshold logic units preceding said one unit in the same logic means being connected logically in cascade with each other and with said one unit, said additional units each having a plurality of preselected weighted binary inputs, a tare of predetermined weight and a single binary output that is connected in parallel to each of the succeeding units including said one unit to constitute at least one of said weighted inputs thereto, and said means for conveying the *n* address inputs from the address register including *n* lines connected in parallel to every one of said threshold logic units to constitute part of the weighted inputs to said units.

4. The combination according to claim 2, wherein each such threshold logic unit comprises a plurality of resistors of adjustable value for variously weighting the inputs to respective predetermined values.

5. The combination according to claim 1, wherein each logic means comprises:

auxiliary storage means having binary coded indicia representing predetermined weighting values to be applied to those address inputs and to a tare input, at least one accumulator per bit position for algebraically summing each address input times its respective weighting value plus the predetermined tare weight input to provide an output signal only if a preselected threshold is exceeded, and means including means responsive to a logical "1" in a respective address input for causing read-out into each such accumulator of the weighted values of the address inputs.

6. The combination according to claim 1, wherein each logic means comprises:

an electronically changeable magnetic core storage unit having binary coded indicia representing predetermined weighting values to be applied to those address inputs which are in a "1" state and to a tare input, at least one accumulator per bit position for algebraically summing each address input times its respective weighting value and the weighted tare input to provide an output signal only if a preselected threshold is exceeded, and means responsive to a logical "1" in each respective address input for causing read-out into such accumulator of the weighted values corresponding to such address inputs, and assigned for that particular bit position of the word.

References Cited

UNITED STATES PATENTS

| | | | |
|---|---|---|---|
| 3,162,774 | 12/1964 | Winder | 307—88.5 |
| 3,229,115 | 1/1966 | Amarel | 307—88.5 |
| 3,234,401 | 2/1966 | Dinman | 307—88 |
| 3,317,753 | 5/1967 | Mayhew | 307—88.5 |
| 3,327,291 | 6/1967 | Lee | 340—172.5 |

PAUL J. HENON, *Primary Examiner.*

R. RICKERT, *Assistant Examiner.*